Oct. 25, 1960  E. M. BRANDENBERGER ET AL  2,957,307
POWDER PROPELLANT ROCKET MOTORS
Filed Nov. 6, 1956
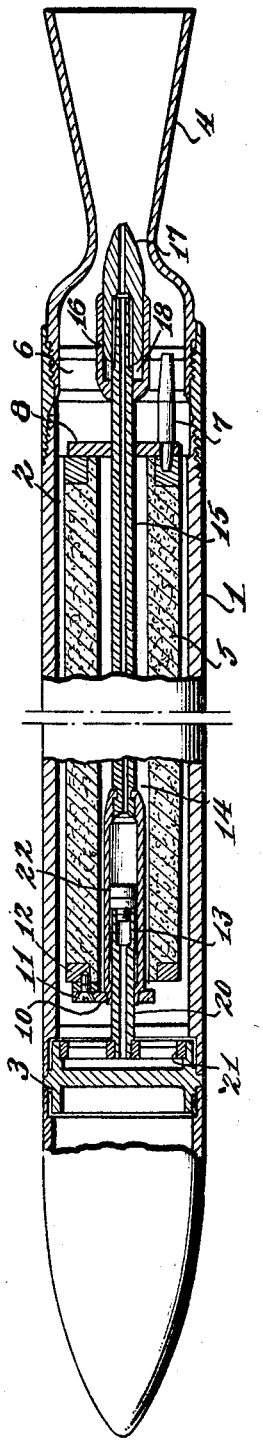
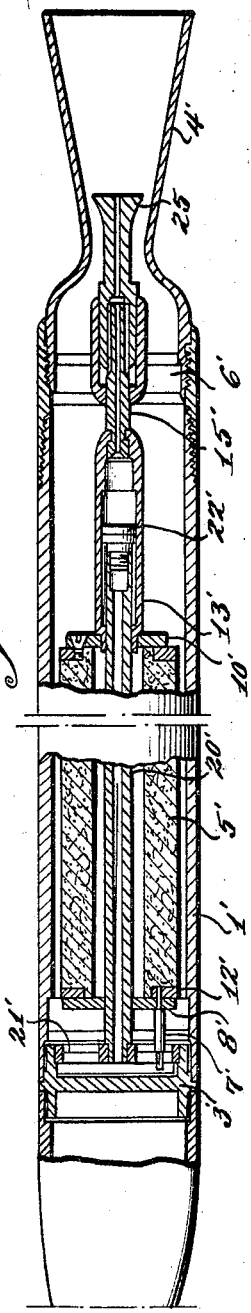
INVENTOR
ERNST M. BRANDENBERGER,
ERNST TANNER,
BY Stone, Boyden & Mack
ATTORNEYS

United States Patent Office 2,957,307
Patented Oct. 25, 1960

2,957,307

POWDER PROPELLANT ROCKET MOTORS

Ernst M. Brandenberger and Ernst Tanner, Asheville, N.C., assignors to Amcel Propulsion, Inc., a corporation of Delaware Filed Nov. 6, 1956, Ser. No. 620,767

9 Claims. (Cl. 60—35.6)

This invention relates to rocket motors, and, more particularly, to powder propellant rocket motors having means associated therewith to maintain the internal ballistics of the rocket motor, as determined by pressure, burning time, temperature, etc., as constant as possible. The invention is applicable to rocket motors in general and is especially useful for rocket motors having relatively short burning time. The invention may be applied, for example, to ordnance rockets of the type herein illustrated, to boosters for guided missiles and the like and to other types of rocket motors, whether the motor be the sole propelling means, or a supplementary device.

Powder propellant rocket motors have improved to such an extent in recent years that they are used quite extensively as missiles in warfare. For such use, they must be able to operate satisfactorily and in the same manner over extreme variations of ambient temperature. Particularly, air-to-air or air-to-ground missiles are carried by airplanes from ground level to extreme heights, such that ambient temperature may vary between −60° C. and +60° C. For most satisfactory operation, the propellant charges of such missiles must have the same characteristics of operation at the lower limit of temperature as at the upper, and for all temperatures therebetween. However, the pressure within the motor chambers of powder propellant rockets varies with temperature, increasing with increasing ambient temperature and decreasing with decreasing ambient temperature. At very high pressures, the rockets are in danger of explosion, and at low pressures, burning extinction, and failure of the rocket are possible.

Various remedies of this dependence of powder propellant rockets upon ambient temperature and internal pressure have been proposed. One remedy is the use of various powder compositions with special additives to minimize temperature sensitivity. However, such compositions have low specific impulses, so that their effectiveness is reduced.

A second proposed remedy for the condition is the provision of mechanical means to adjust the nozzle area in accordance with interior pressure. Several different types of this remedy have been suggested. In one proposal, the effective exhaust area of the nozzle or exhaust opening of the rocket motor is varied manually in accordance with the known ambient temperature. This solution obviously is imperfect, because of human failures and because of the inaccessibility of some rocket missiles during flight, when they are most exposed to extreme temperature variation.

Another type of mechanical adjustment of the effective exhaust area of the rocket nozzle which has heretofore been proposed is an automatic adjustment of the effective exhaust area through the medium of a thermostatic element exposed to ambient temperature. However, we have found that the burning rate of the propellant charge is dependent directly, not upon ambient temperature, but upon the actual temperature of the powder charge. A powder charge has poor heat conductivity, so that powder temperature and ambient temperature may be quite different from each other. Consequently, with the adjustment dependent upon ambient temperature, extreme variation of the burning rate of the powder charge is still possible over a large range of temperature variation.

The present invention avoids all of the difficulties of the prior art solutions to the problem, permitting automatic and continuous adjustment of the effective exhaust area of the nozzle opening in accordance with the temperature of the powder propellant.

The present invention, generally speaking, includes, in addition to the casing, the propellant charge of the usual rocket motor, and the nozzle defining the exhaust for gases from the rocket motor chamber, means for translating temperature change into movement and responsive to changing ambient temperature at substantially the same rate as the powder charge, this means being operable by its movement to change the effective exhaust area of the nozzle opening.

In a preferred embodiment of the invention, the powder charge itself is allowed to contract or expand in length in response to changing ambient temperature, and the changing length of the powder charge causes a member associated therewith to move to vary the effective exhaust area of the nozzle opening. With this apparatus, the effective nozzle throat area is changed directly in correspondence with the changing temperature of the powder propellant, so that the internal ballistics of the propellant are maintained substantially constant despite extreme variation in pressure. This permits a great increase in the range of conditions within which devices carrying such rocket motors may operate, while at the same time reducing tremendously the effect of temperature variation on the characteristics of operation of the rocket motors.

The invention will now be more fully described in conjunction with the accompanying drawing.

In the drawing,

Fig. 1 is a sectional view of the rocket motor of a preferred embodiment of the invention, and Fig. 2 is a sectional view of a different embodiment of the invention.

The conventional powder-propellant rocket includes a casing 1 of suitable material and structure defining within it a motor chamber 2. A plug 3 defines the forward end of the motor chamber and is designed to be coupled to the warhead (not shown). At the after-end of the casing, the usual nozzle of venturi shape 4 is shown, the nozzle being appropriately fixed to the casing. The casing is preferably cylindrical in shape.

The propellant powder charge 5 is mounted within the motor chamber at the after-end by a spider 6 fixed to the casing, and a fastener pin 7 fixed to the spider and to the cylindrical powder charge. A supporting plate 8 is attached to the rear end of the charge by fastener pin 7. The forward end of the powder charge is free to move with respect to the casing.

The powder charge of Fig. 1 is of any suitable composition and configuration, the present invention being usable with any rocket motor which utilizes a powder charge having a constant burning rate for a given temperature and pressure and being a relatively poor conductor of heat so as to exhibit a slow rate of response to changing ambient temperature. For instance, the usual double-base propellant has such characteristics, and the present invention is usable therewith.

It will be evident from the above that the powder charge, having the characteristic of changing in volume in accordance with changes in its temperature, will change its axial length in response to changing temperature of the charge, since it is fixedly attached to the casing at only one end of the charge.

At the opposite end of the powder charge from the fixed connection to the casing, the charge carries a plate 10 attached to the charge y means of a fastener 11 which is threaded into a supporting ring 12 on the end of the charge. Fixed to plate 10 is a cylindrical sleeve 13 extending rearwardly within an internal bore 14 of the powder charge and being fixed at its rearward end to a cylindrical rod 15. Rod 15, having a longitudinal bore, extends substantially the entire length of the motor chamber of the rocket and projects at its rearward end through a sleeve 16 mounted on the spider 6. Rod 15 is advantageously of a material having a very low temperature coefficient of expansion, such as the various well-known iron-nickel alloys marketed for use in applications where substantial dimensional changes with temperature are to be avoided. The rod has a sliding engagement with the sleeve, the sleeve serving to hold the rod against any movement other than axially of the motor chamber. At its extreme rearward end, the rod is fixed to a throttling member 17 having a central bore in alignment with that of the rod 15. This member is cylindrical at its forward end, so as to move within a cylindrical chamber 18 in sleeve 16, and which is conical at its rearward end. The rearward end of the throttling member 17 projects into the exhaust nozzle 4 of the rocket motor and controls the effective exhaust area of the nozzle.

From the above description, it will be evident that, when the temperature of the rocket propellant powder charge changes, the axial length of the charge will change correspondingly in accordance with the coefficient of expansion of the powder charge, and this change in length will advance the throttling member into the nozzle or retract it therefrom, depending upon the direction in which the length of the powder charge is changing. Specifically, if the temperature of the powder charge increases, the plate 10 at its forward end will move forwardly toward plug 3 and carry the throttling member 17 forwardly to increase the effective exhaust area of the nozzle. In contrast, if the temperature of the powder charge decreases, plate 10 will move rearwardly, causing the rod 15 to move therewith and advance the throttling member into the nozzle to decrease the effective exhaust area thereof.

The apparatus described above achieves a continuous adjustment of the effective exhaust area of the nozzle in accordance with temperature of the propellant powder charge. With such apparatus, it has been found that the burning rate of the powder charge can be maintained nearly constant over extremes of temperature of the powder charge from, for instance, $-60°$ C. to $+60°$ C. Thus, with the invention as described in conjunction with Fig. 1, it has been found that the burning time of a particular powder charge can be maintained within 0.2 second constant at the extremes of temperature referred to. With the same powder charge, but without the apparatus of the present invention, a change in burning time of as much as 1 second has been observed. With the short burning time of conventional powder charges for missile rockets, this advance is extremely important.

While, as noted above, it is extremely important to vary the effective exhaust area of the nozzle continuously in correspondence with changing temperature of the powder charge before firing of the rocket, it is also extremely important that no further change in effective exhaust area be permitted after the powder charge is ignited. Obviously, the very high temperatures generated by ignition of the powder charge would cause large changes in the effective exhaust area of the nozzle after firing, and these changes would not be desirable. The apparatus of the present invention includes means for clamping the throttling member of the invention to the casing when the powder charge is ignited, to prevent any further variation in effective exhaust area of the nozzle after ignition.

In order to accomplish this last-mentioned purpose, the apparatus of the invention includes a hollow stud 20 fixed at its forward end to a spider 21 fixed to the plug 3. Stud 20 extends into the bore of the propellant and within sleeve 13, and sleeve 13 has a sliding fit on the stud. At its rearward end, the stud has a relatively thin wall, and at its extreme rearward end, the stud carries the detonator and primer cap 22, which may be of conventional type. The wall of the stud adjacent the detonator is so thin that, when the detonator is actuated, the pressure of gases generated thereby causes the wall of the stud to expand and grip the inner wall of sleeve 13. Since the stud is fixed with respect to the casing, and the sleeve, rod, and throttling member are fixed with respect to each other, when the detonator is actuated and the clamping action takes place, the throttling member is fixed with respect to the casing, so that no further change in the effective exhaust area of the nozzle can occur.

It will be understood that the detonator may be set off in any well known manner, as, for example, via electrical wires extending rearwardly through the aligned bores in the rod 15 and throttle member 17. The detonator may ignite the propellant or powder charge 5 in any desired or conventional way. In accordance with the usual practice, the detonator may be so constructed that the hot gases therefrom do not travel rearwardly but are discharged forwardly through the hollow plug 20, from which they impinge against and set off an ignition charge (not shown) located in the recess at the rear side of plug 3.

The apparatus of Fig. 1 includes a powder charge having its rear end fastened to the casing of the motor chamber and its forward end free to move with respect to the casing in response to changes in length of the charge caused by changing temperature. The forward end of the charge is fixedly connected to the throttling member to adjust the nozzle exhaust automatically in response to such movement of the forward end of the charge. However, it is not necessary that the forward end of the charge be free to move and be connected to the throttling member, for the rearward end can be so arranged and connected. Fig. 2 shows an embodiment of the invention so designed.

In Fig. 2, parts corresponding to those of Fig. 1 have been identified with the same reference numerals primed. The supporting plate 8' is attached to the forward end of charge 5' by the stud 7' which is mounted on spider 21'. The result is that the forward end of the charge is restrained against movement with respect to the casing. The plate 10' is attached to the rear end of the charge and that end of the charge is free to move longitudinally of the casing. The sleeve 13' is then carried by the rear end of the charge, and the rod 20' is extended to fit within it.

The other elements of the apparatus of Fig. 2 are identical to those of Fig. 1 in arrangement, as well as design, with the exception of the throttling member 25 which is of rearwardly outwardly flaring configuration, rather than the configuration of the throttling member of Fig. 1. This design compensates for the reverse direction of movement of the free end of the powder charge of the apparatus of Fig. 2. The apparatus of this second embodiment of the invention otherwise works in identically the same manner as the design of Fig. 1 so the operation need not be repeated.

It will be understood that the embodiments of the invention herein specifically shown are illustrative only and that many changes can be made therein without departing from the scope of the invention. Thus, it is not essential that the powder charge be cylindrical or of any special configuration nor that the specific advantageous attaching and supporting features here shown be employed,

We claim:

1. A rocket motor including a casing defining a motor chamber, a propellant powder charge positioned within said motor chamber, said charge having a variable burning rate dependent upon temperature and pressure in the motor chamber and being a relatively poor conductor of heat so as to exhibit a slow rate of response to changing ambient temperature, means fixed to said casing defining an exhaust opening for discharging gases from the motor chamber out of the rocket motor, means responsive substantially only to the temperature of the powder charge operable to change the effective area of the exhaust opening in proportion to the change in temperature of the powder charge, said means including a throttling member operatively connected to said charge and positioned adjacent said exhaust opening for movement in response to changes in the longitudinal dimensions of said charge, to change the effective exhaust area, and means operatively associated with said throttling member to secure the same against further movement when said powder charge is ignited.

2. The apparatus of claim 1 in which said temperature-responsive means includes a rod of substantial length positioned within said motor chamber and having one of its ends fixed to said throttling member, said rod being movable longitudinally in response to change in temperature of said powder charge.

3. The apparatus of claim 6 having a primer cap and detonator in said motor chamber to ignite said powder charge in response to actuation of said detonator, a sleeve fixed to said rod and positioned closely adjacent said detonator, and a hollow wall metal stud fixed to said casing and cooperating with said detonator, said stud being expandable by pressure caused by actuation of said detonator into clamping engagement with said sleeve to clamp the sleeve to the casing.

4. A rocket motor including a casing defining a motor chamber, a propellant powder charge positioned within said motor chamber, said charge having a variable burning rate dependent upon temperature and pressure in the motor chamber and being a relatively poor conductor of heat so as to exhibit a slow rate of response to changing ambient temperature, said charge having a dimension which changes with change in the temperature of the charge, a first surface of said charge, defining one end of said dimension, being fixed to said casing and a second surface, defining the other end of said dimension, being free to move with respect to the casing prior to ignition of the powder charge, means fixed to said casing defining an exhaust opening for discharging gases from the motor chamber out of the rocket motor, means responsive substantially only to the temperature of the powder charge operable to change the effective area of the exhaust opening in proportion to the change in temperature of the powder charge and including a throttling member positioned adjacent said exhaust opening and movable to change the effective exhaust area thereof, said last-mentioned means further including a rod fixed at one end to said throttling member and fixed at its other end to said powder charge at a point adjacent said second surface thereof, and means operatively associated with said throttling member to secure the same against further movement when said powder charge is ignited.

5. A rocket motor including a casing defining a motor chamber, a propellant powder charge of cylindrical shape fixed at one end of said casing, said powder charge having a variable burning rate dependent upon temperature and pressure in the motor chamber and being a relatively poor conductor of heat so as to exhibit a slow rate of response to ambient temperature, a primer cap and detonator to ignite said powder charge upon actuation of the detonator, means fixed to said casing defining an exhaust opening at one end of the motor chamber for discharging gases from the motor chamber out of the rocket motor, a rod of substantial length extending parallel to the axis of said powder charge, a cylindrical sleeve fixed to the opposite end of the powder charge and to the adjacent end of the rod, said opposite end of the powder charge being movable with respect to the casing, said powder charge being expandable to change its axial length in response to change in its temperature, a throttling member fixed to the opposite end of the rod and positioned in the exhaust opening, said throttling member being operative to vary the effective area of the exhaust opening upon movement of said rod longitudinally, and a metal stud of cylindrical shape fixed to the casing and enclosing said detonator, said stud fitting within said sleeve and having walls expandable outwardly on actuation of said detonator by the pressure generated thereby into fixed engagement with said sleeve to hold the sleeve against movement with respect to the casing after actuation of said detonator, whereby variation of the effective area of the exhaust opening in response to change in the temperature of the powder charge is obtained before actuation of said detonator, but further variation is prevented after actuation thereof.

6. The apparatus of claim 5 in which the end of the powder charge next adjacent the exhaust opening is the one fixed to the casing, said powder charge has an internal chamber extending along its length into which said primer cap, detonator, stud, and sleeve project from adjacent said opposite end of the powder charge.

7. The apparatus of claim 5 in which the end of the powder charge most remote from the exhaust opening is the one fixed to the casing.

8. In a rocket motor, the combination of a casing defining an elongated chamber; means fixed to said casing and defining at one end of said chamber an exhaust opening via which gases can be discharged from the chamber; an elongated solid propellant powder charge disposed in said chamber and having a longitudinal bore extending toward said exhaust opening, said powder charge being characterized by a variable burning rate dependent upon the temperature and pressure in said chamber and also by relatively poor heat conduction capabilities so as to exhibit a slow rate of response to changing ambient temperature conditions; a throttling member disposed in operative relation to said exhaust opening; an elongated operating rod connected at one end to said throttling member and extending within the longitudinal bore of said powder charge, the end of said powder charge adjacent said exhaust opening being fixed to said casing and the opposite end thereof being connected to said operating rod, whereby changes in the longitudinal dimension of said powder charge due to temperature variations are converted to changes of the position of said throttling member with respect to said exhaust opening; means for igniting said powder charge, and means responsive to ignition of said powder charge for fixing said operating rod against further movement.

9. In a rocket motor, the combination of a casing defining an elongated chamber; means fixed to said casing and defining at one end of said chamber an exhaust opening via which gases can be discharged from the chamber; an elongated solid propellant powder charge disposed in said chamber and having a longitudinal bore extending toward said exhaust opening, the end of said charge opposite said exhaust opening being fixed to the casing and the end adjacent said exhaust opening being free to move with respect to the casing, said powder charge being characterized by a variable burning rate dependent upon the temperature and pressure in said chamber and also by relatively poor heat conduction capabilities so as to exhibit a slow rate of response to changing ambient temperature conditions; a hollow operating member fixed to said powder charge at the free end thereof and extending toward said exhaust opening; a throttling member fixed to said operating member and operatively disposed with respect to said exhaust opening, changes in the longitudinal dimension of said powder charge being converted into changes in position of said throttling member with respect to said exhaust opening via said operating member; an elongated stationary member secured to said casing and extending through the bore of said powder charge into said hollow operating member, and means responsive to ignition of said powder charge for fixing said operating member to said stationary member and thereby preventing further movement of said throttling member with respect to said exhaust opening.

References Cited in the file of this patent
UNITED STATES PATENTS

| | | |
|---|---|---|
| 2,612,747 | Skinner | Oct. 7, 1952 |
| 2,798,430 | Grimes | July 9, 1957 |
| 2,870,599 | Long | Jan. 27, 1959 |